July 29, 1969    D. H. HAGEN    3,457,805
TRANSMISSION MECHANISM

Filed Jan. 17, 1968    8 Sheets-Sheet 1

INVENTOR
DONALD H. HAGEN
BY Williamson, Palmatier
& Bains    ATTORNEYS

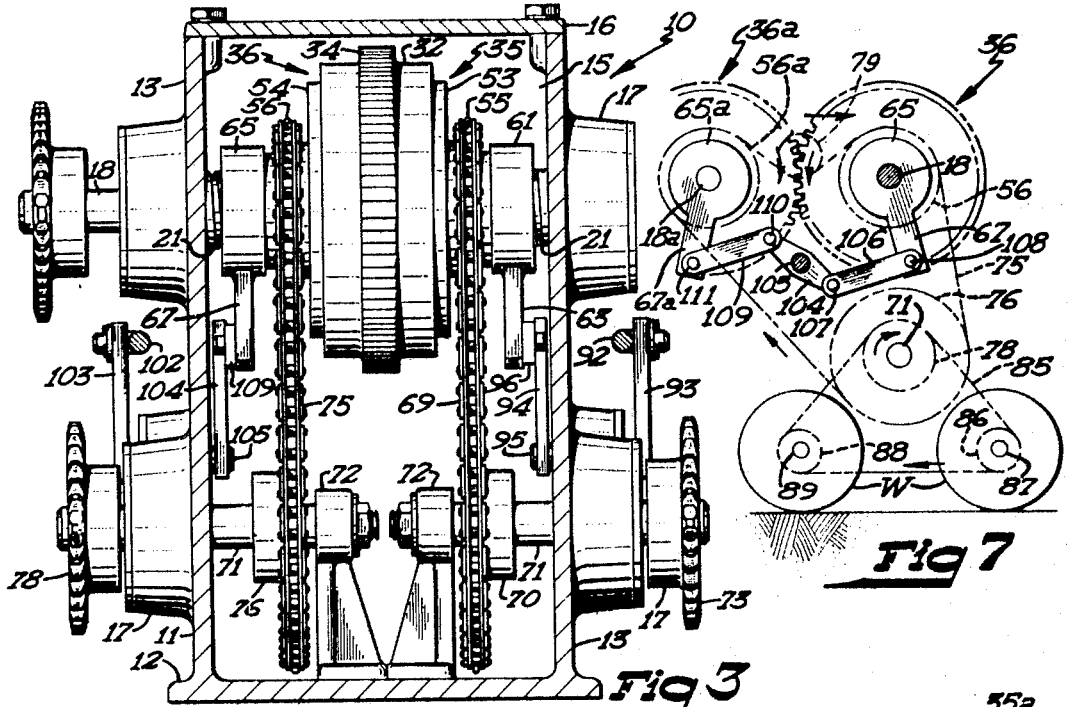
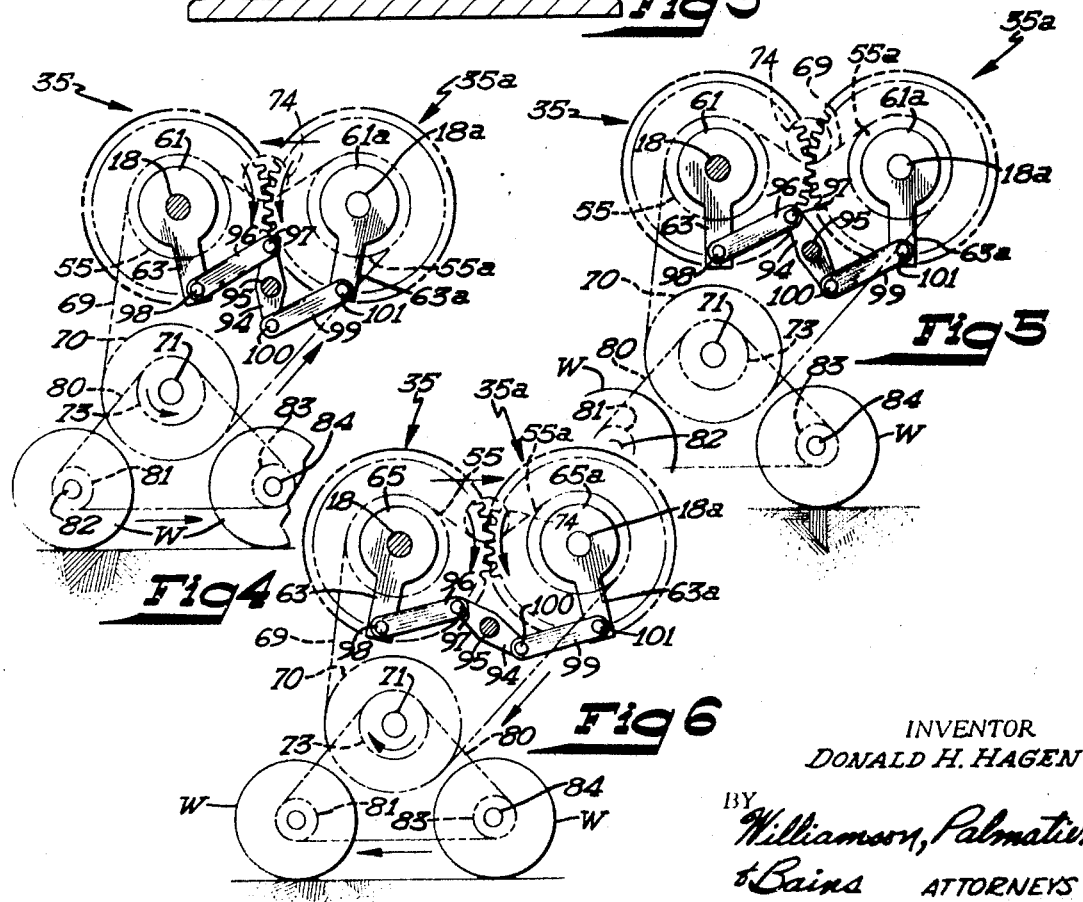

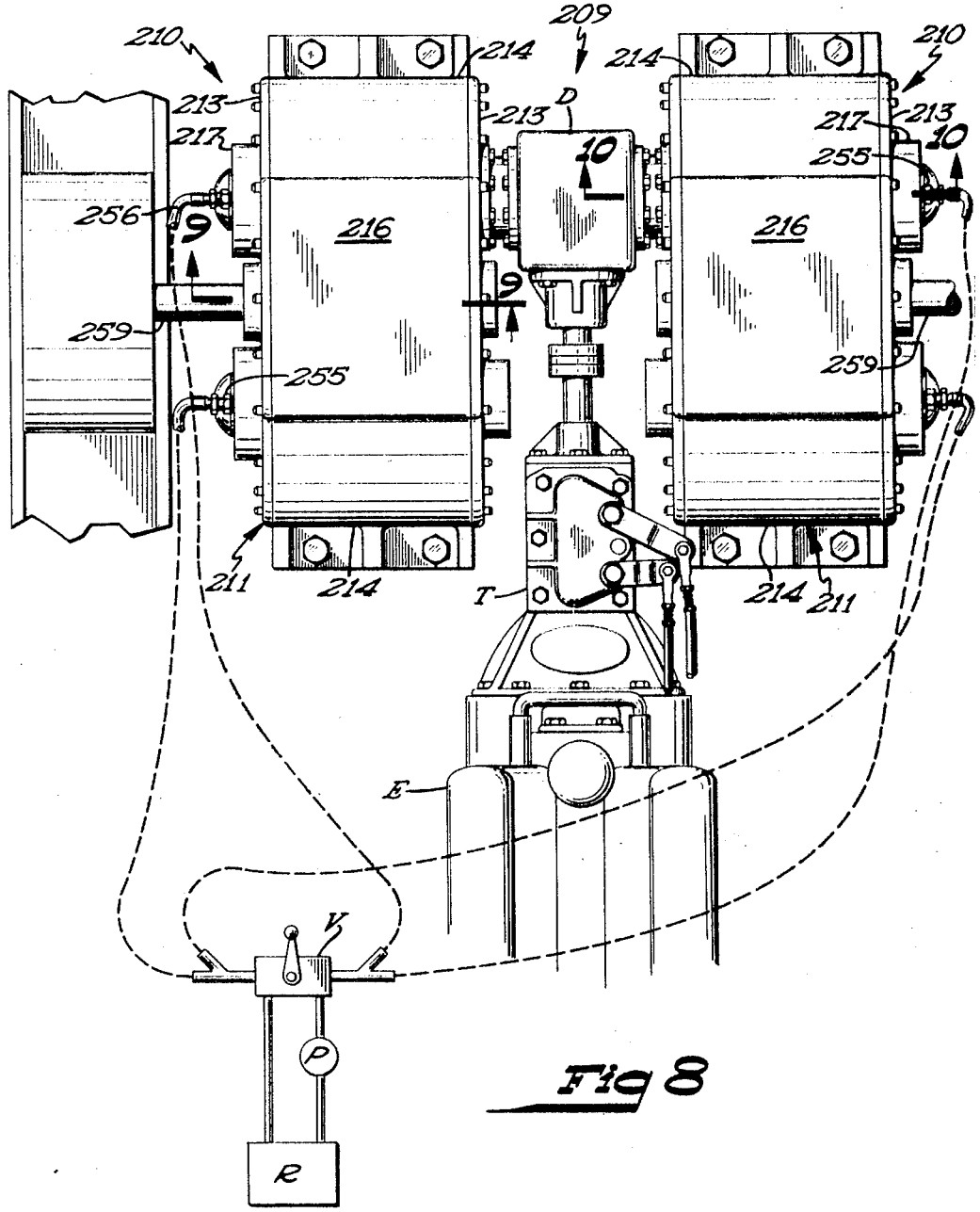

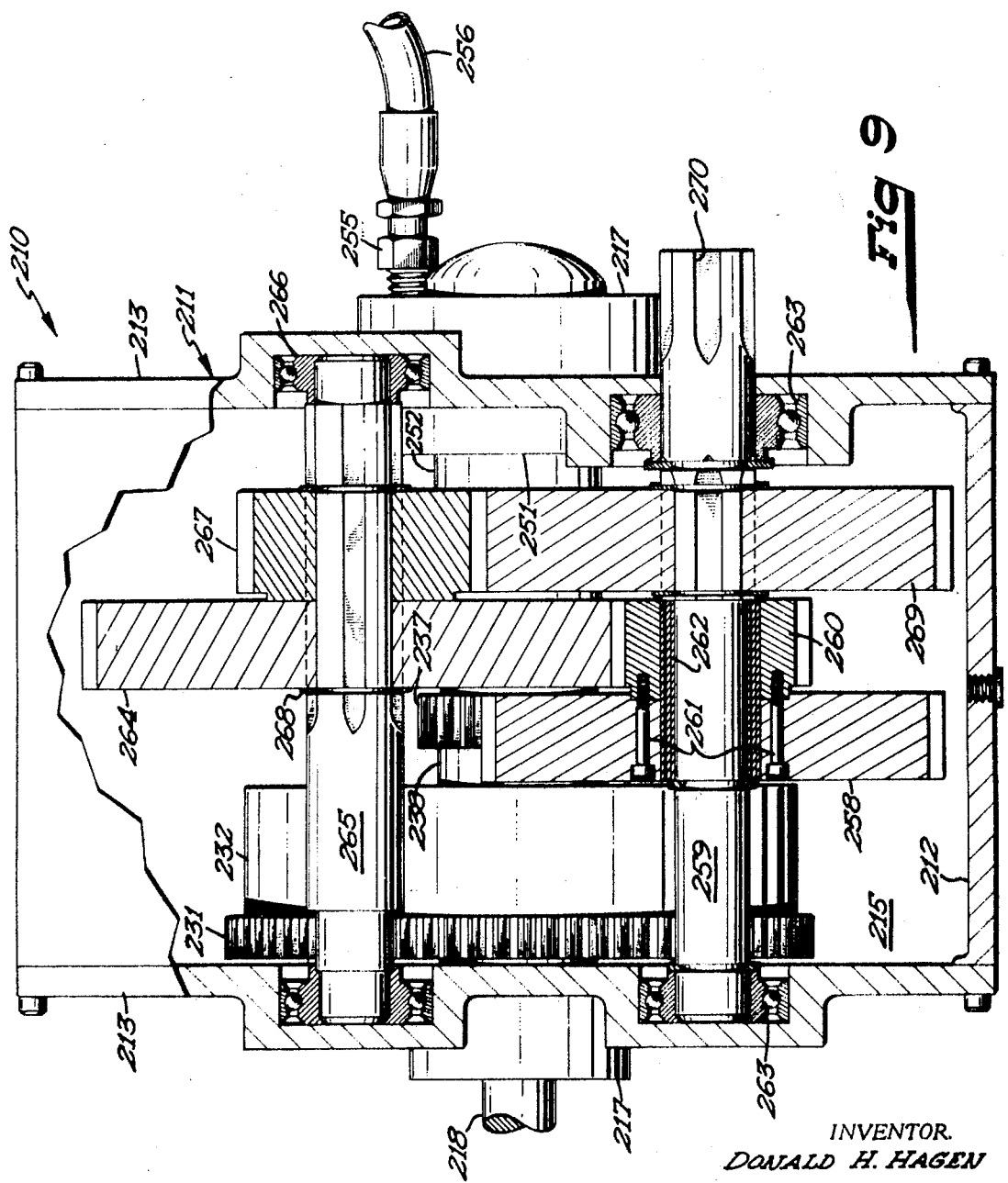

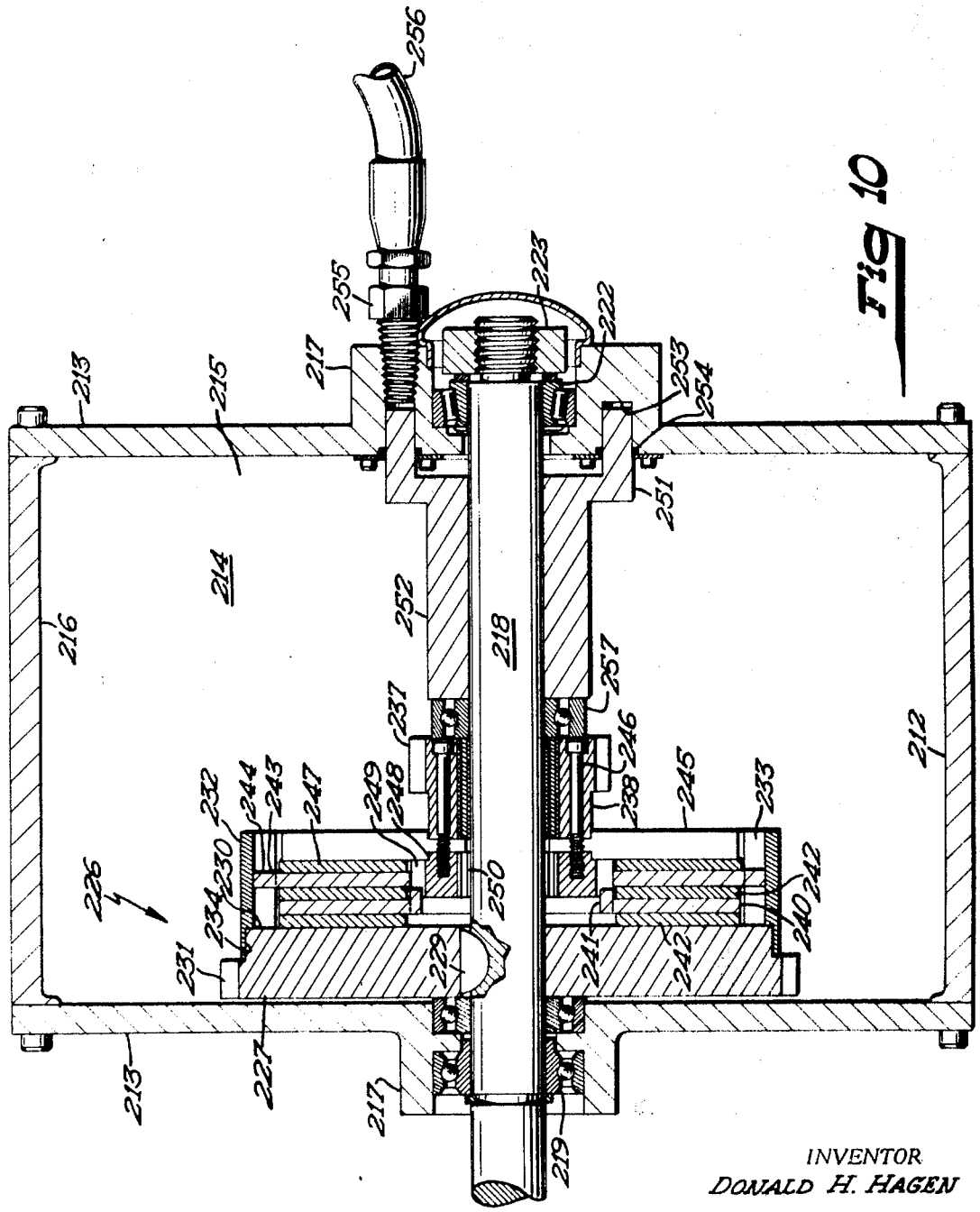

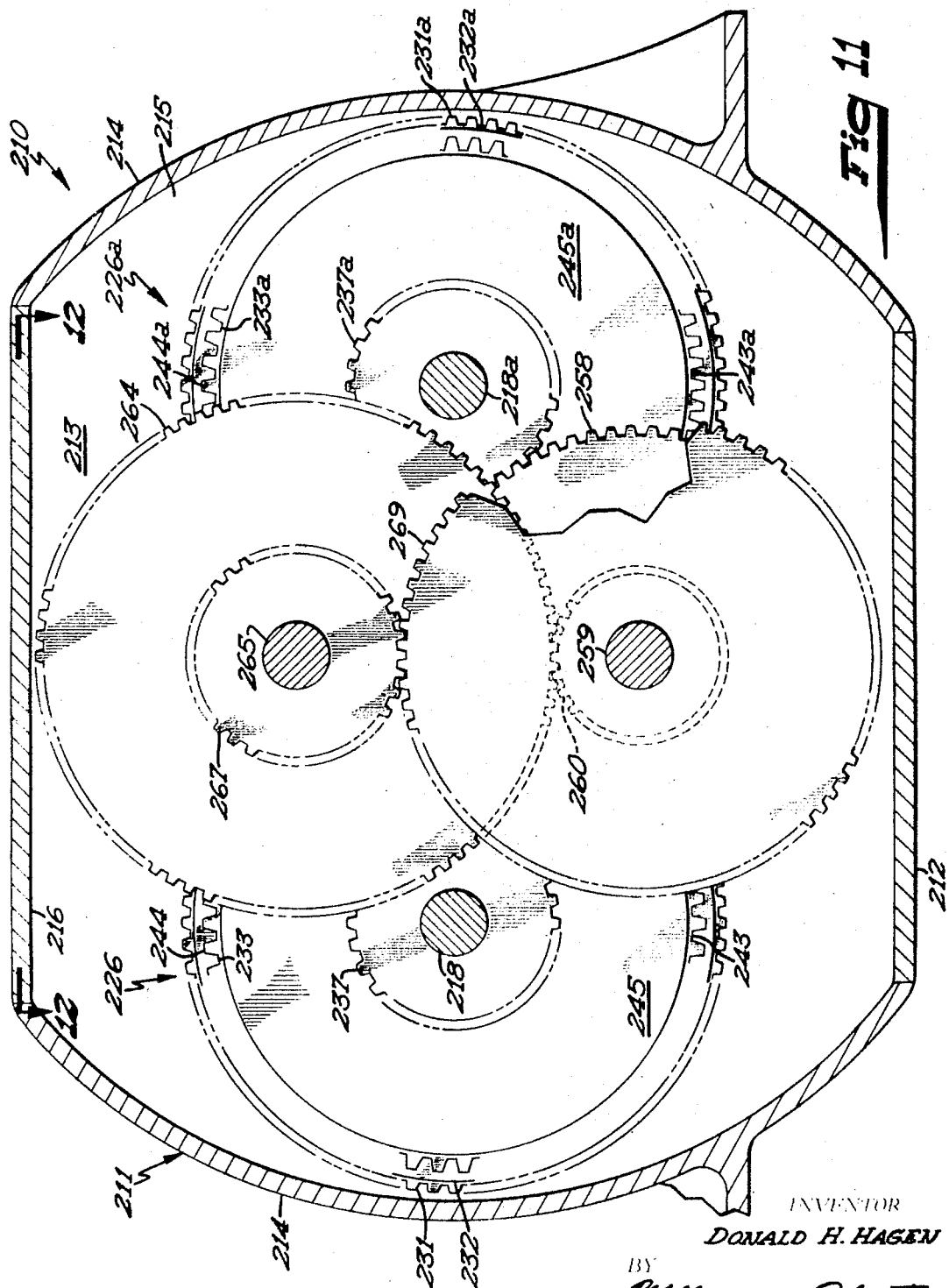

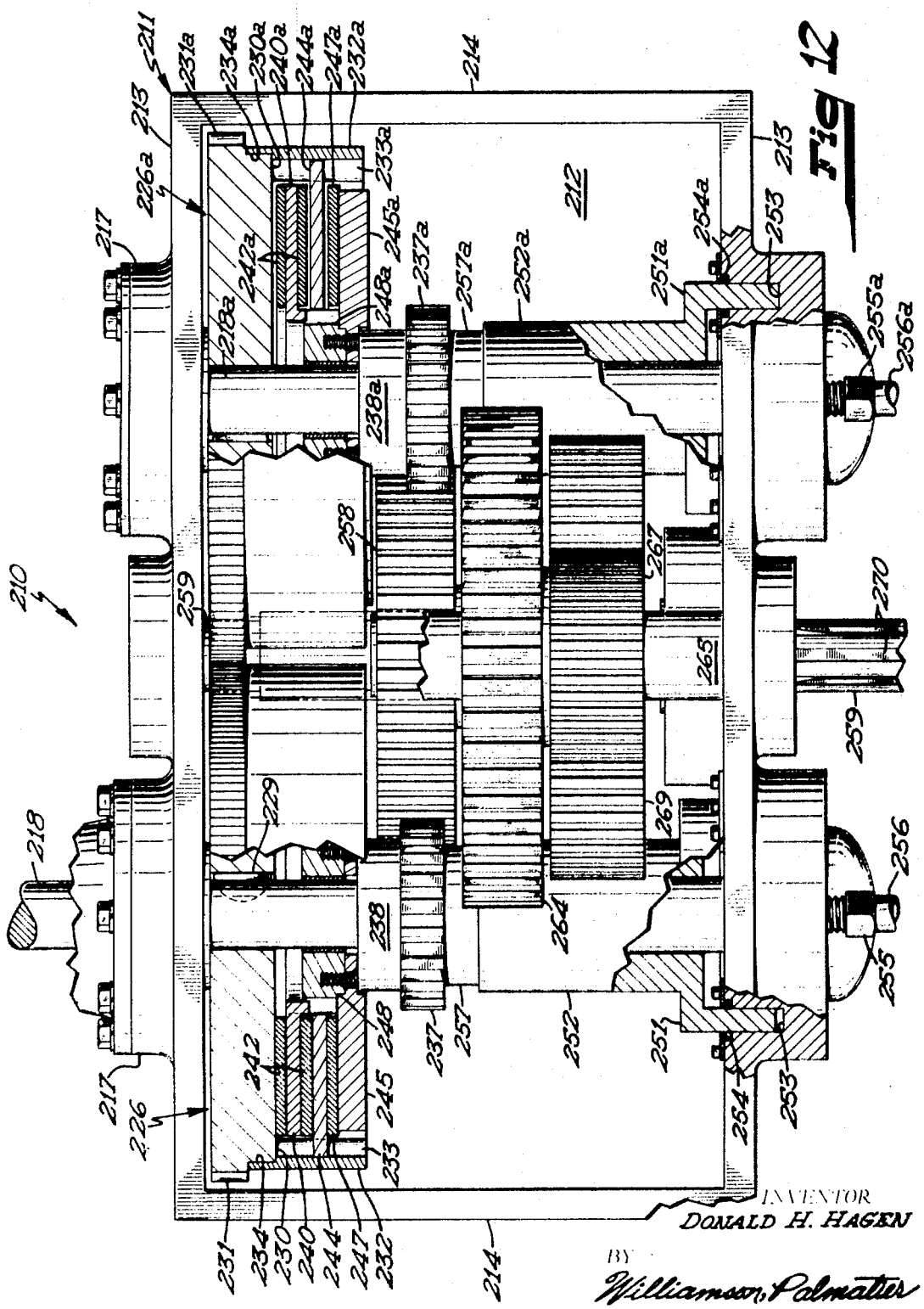

United States Patent Office
3,457,805
Patented July 29, 1969

3,457,805
TRANSMISSION MECHANISM
Donald H. Hagen, 4213 61st Ave. N.,
Brooklyn Center, Minn. 55429
Filed Jan. 17, 1968, Ser. No. 698,570
Int. Cl. F16h 37/06
U.S. Cl. 74—665       11 Claims

ABSTRACT OF THE DISCLOSURE

A transmission device including a pair of shafts, one of which is driven, and each having a gear secured thereto for rotation therewith, the gears being disposed enmeshed with each other. A pair of clutch means on opposite sides of each gear and each having revolvable output elements associated therewith. Drive means including a chain drive or gear drive drivingly connected with the revolvable output elements and the member (ground wheels) to be driven, and clutch actuators for simultaneously actuating the clutch means located on the same sides of the gears, so that the driven members (ground wheels) may be individually or simultaneously driven in reverse or forward direction.

---

An object of this invention is to provide a novel transmission system or device for selectively connecting an engine with driven members such as ground engaging wheels or the like, the device including a pair of drive transmitting members each having a pair of clutch means associated therewith through which drive is transmitted to the driven structures, the output means of one of the pairs of clutch means being drivingly connected with the output means of one of the other pair of clutch means, and clutch actuating means for simultaneously actuating a pair of interconnected clutch means to thereby enable the driven structures to be driven individually or simultaneously in either a forward or reverse direction.

Another object of this invention is to provide an improved transmission system for selectively interconnecting driven structures, such as ground engaging wheels, with an engine or power source, the transmission system being arranged and constructed so that the driven structures may be simultaneously or individually driven in either direction, thus making the transmission system especially adapted for use as a steering system for a ground traversing vehicle or the like. One application of the novel transmission system has been as a combination of steering and drive system for land vehicles whereby the wheels on one side of the vehicle may be simultaneously or separately driven in a forward or reverse direction with respect to the wheel or wheels located at the other side of the vehicle. This arrangement has been found to permit excellent maneuverability of the vehicle and the transmission device is arranged and constructed to minimize wear thereto, but permitting positive drive from the power source.

These and other objects and advantages of this invention will more fully appear from the following description made in connection with the accompanying drawings wherein like reference characters refer to the same or similar parts throughout the several views, and in which:

FIG. 3 is a vertical transverse section taken approximately along line 3—3 of FIG. 1 and looking in the direction of the arrows;

FIG. 4 is a diagrammatic illustration showing one of the clutch actuating means in a forward driving relation and thereby illustrating how the transmission can be used to drive and steer a vehicle;

FIG. 5 is a diagrammatic view similar to FIG. 4 but illustrating the clutch actuating means in a neutral position;

FIG. 6 is a view similar to FIG. 4, but illustrating the clutch actuating means in a reverse driving relation;

FIG. 7 is a view similar to FIG. 4 but illustrating the other clutch actuating means in an operative condition;

FIG. 8 is a top plan view of a modified form of the invention;

FIG. 9 is a cross-sectional view taken approximately along line 9—9 of FIG. 8 and looking in the direction of the arrows;

FIG. 10 is a cross-sectional view taken approximately along line 10—10 of FIG. 8 and looking in the direction of the arrows;

FIG. 11 is a side-elevational view of one of the transmission units with portions thereof broken away for clarity; and FIG. 12 is a transverse cross-sectional view taken approximately along line 12—12 of FIG. 11 and looking in the direction of the arrows.

Figure 1:
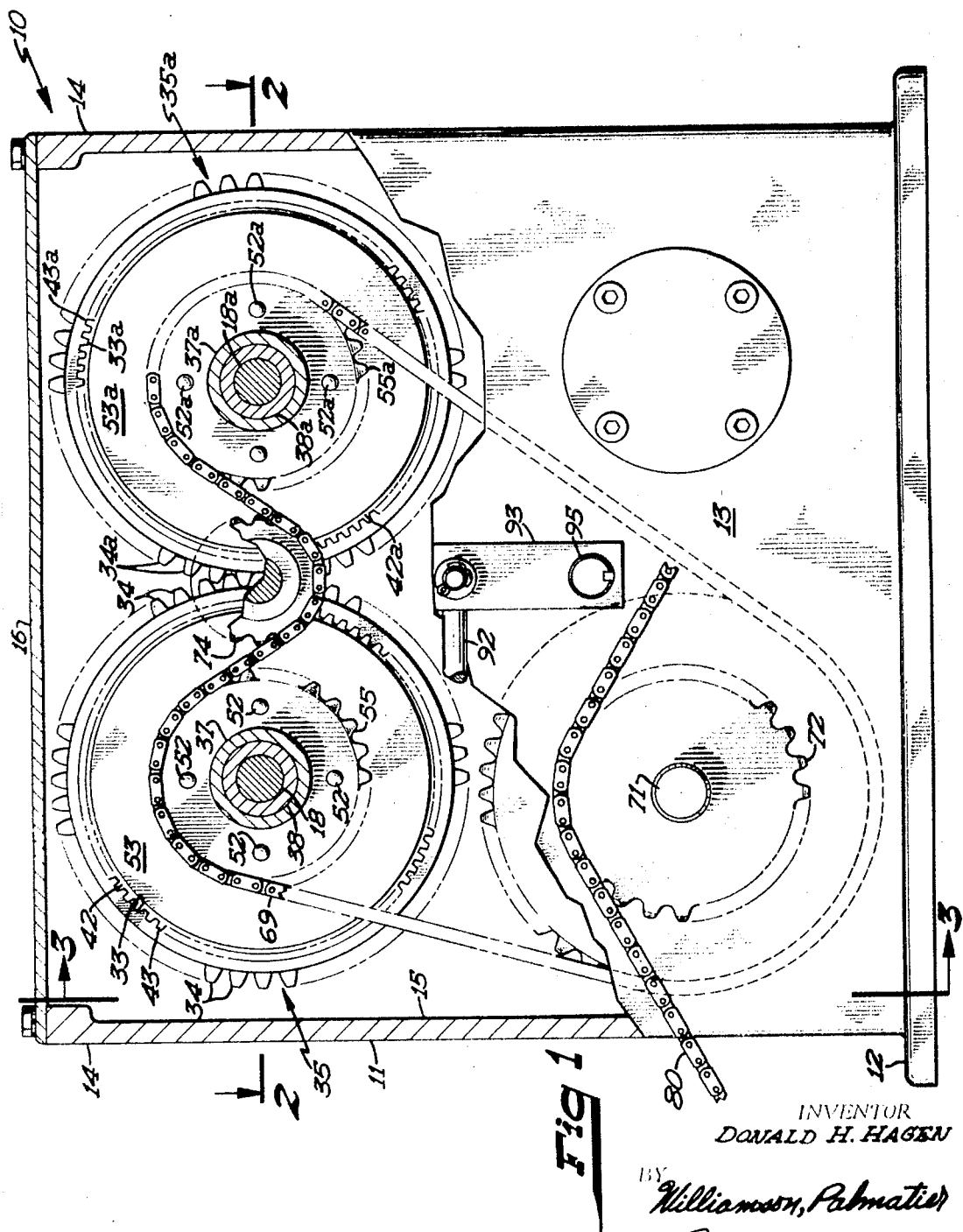
FIG. 1 is a side elevational view of the transmission system with parts thereof broken away for clarity.
Figure 2:
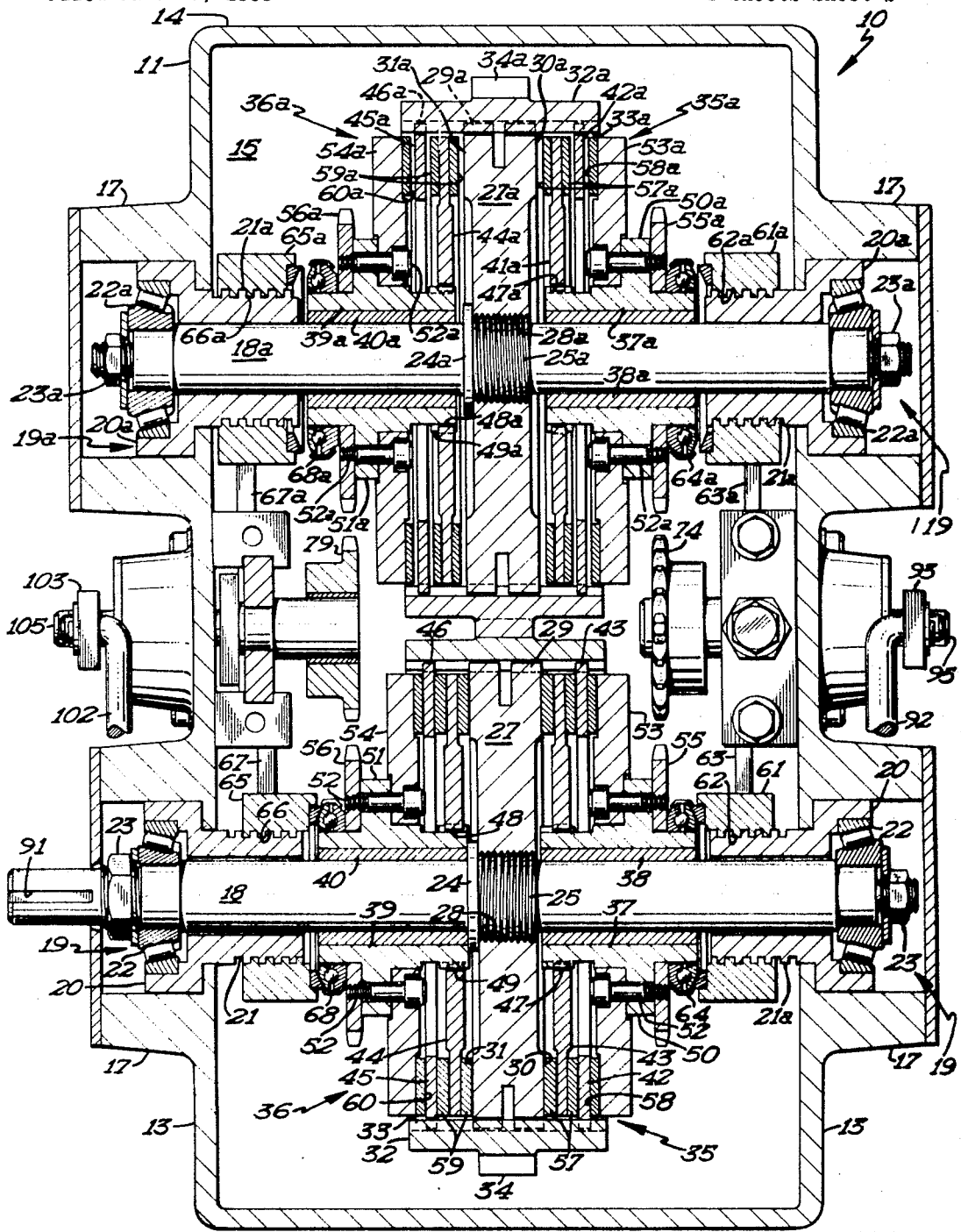
FIG. 2 is a horizontal transverse section taken approximately along line 2—2 of FIG. 1 and looking in the direction of the arrows.

Referring now to the drawings, and especially to FIGS. 1 to 3, it will be seen that one embodiment of the novel transmission system, designated entirely by the reference numeral 10 is there shown.

This transmission system is especially adapted for transmitting drive to the ground engaging wheels of vehicles and is so arranged and constructed that the transmission system can be used to steer such a vehicle. The transmission system 10, which is of compact construction, and which may be mounted or located conveniently on the vehicle, includes a housing or casing 11, which is of generally rectangular configuration and which is formed of a suitable rigid, metallic material and is comprised of a bottom plate 12, side plates 13 and end plates 14. Access to the interior or chamber 15 of the housing 11 is possible through the upper end thereof, and this upper end is closed by a top plate 16 which is removable. The chamber or interior 15 of the housing 11 is sealed from the exterior, and this interior is partially filled with a suitable lubricant so that the various components of the transmission system may be continuously lubricated during the operation of the system.

Each sidewall 13 of the housing 11 has a pair of outwardly projecting generally hollow bosses 17 integrally formed therewith and projecting outwardly therefrom. The side walls 13 are also provided with pairs of registering openings therein, which communicate with the interior of the bosses 17. A first shaft 18 projects through a pair of the registering openings in the housings 11 and a second shaft 18a extends through the other pair of openings in the housing. It will be noted, that the shafts 18 are disposed at the same level and in substantially parallel relation with respect to each other.

A pair of bearing retainer units 19 are positioned concentrically around opposite ends of the shaft 18 and project through openings in the side walls 13. It will be noted that the bearing retaining units 19 are of cylindrical configuration, and each includes an enlarged portion 20 which is positioned exteriorly of the housing. It will be noted, that the external inner end portion 21 of each bearing retaining unit 19 is threaded, the purpose of which will be more fully explained hereinbelow. Suitable self aligning roller bearings 22 are positioned interiorly of the enlarged outer end portions 20 of the bearing retainer units 19, thus permitting the shaft 18 to rotate or revolve relative to the sleeve bearing retaining units 19. Opposite end portions of the shaft 18 are threaded and the roller bearings are retained in place by suitable nuts 23.

A shaft 18a also has sleeve type bearing retainer units 19 positioned concentrically around opposite ends thereof, each including an enlarged outer end portion 20a positioned exteriorly of the housing 11. It will be noted that the respective external inner end portions of the bearing retainer units 19a are also threaded as at 21a. It is pointed out, that the bearing retaining units 19 are radially spaced from the shaft 18, while the bearing retainer units 19a are radially spaced from the shaft 18a. Suitable roller bearings 22a are positioned interiorly of the enlarged outer end portion 20a of the bearing retainer units 19a and nuts 23a threadingly engage the threaded end portions of the shaft 18a to retain the roller bearings against axial movement. It will therefore be seen that the shafts 18 and 18a are each revolvable relative to their associated bearing retainer units.

The shaft 18 has a collar or radial flange 24 integrally formed therewith intermediate the ends thereof and projecting radially outwardly therefrom. The shaft 18 is also externally threaded as at 25, the threads 25 extending axially from the collar or flange 24. Similarly, the shaft 18a has a collar or flange 24a integrally formed therewith and projecting radially outwardly from the central portion thereof. The shaft 18a is also externally threaded adjacent its median portion as at 25a in the manner of shaft 18.

It is pointed out, that the shaft 18 is connected to the engine or power source, and will be revolved in a predetermined direction. To this end, it will be noted that the one end of the shaft 18 projects outwardly beyond the associated boss 17 and has a longitudinal or axial slot 91 therein to accommodate a variable speed pulley or the like, which in turn will be connected by a suitable V-type endless drive belt to the drive pulley of the engine.

Drive transmitting means are provided for transmitting drive from the shaft 18 selectively through clutch means associated with shafts 18 and 18a through driven structures, such as ground wheels and the like. This drive transmitting means includes a first gear structure 26 which is comprised of a generally flat, circular disc 27, which has a threaded opening 28 therethrough, and which has splines or teeth 29 formed on the circumferential edge thereof. The disc 27 also has an annular face 30 on one side thereof and another annular face 31 on the other side thereof. The threaded opening 28 threadingly engages the central threaded portion 25 of the shaft 18.

A gear ring or sleeve 32 having internal splines 33 integrally formed throughout the inner circumferential surface thereof, is positioned concentrically of the disc 27 in pressed fitting relation therewith. It will be noted that the splines of the disc and gear ring 32 are disposed in mating relation and the gear ring extends axially beyond opposite sides or faces of the disc 27. The gear ring 32 has outwardly projecting gear teeth or cogs 34 integrally formed with the central portion thereof.

The drive transmitting means also includes a second gear structure 26a which is comprised of a circular disc 27a having a threaded opening 28a therein. The threaded opening 28a threadingly engages the shaft 18a and disc 27a is also provided with external splines or teeth 29a and presents opposed annular faces 30a and 31a respectively. The discs 27 and 27a are substantially identical except for the direction of the threads which engage the associated shaft. The direction of the threads on one of the discs is oppositely of that of the other disc, since it is desirable that the disc be rotated in a direction to cause it to be tightened upon its associated shaft.

A generally cylindrical gear ring or sleeve 32a having internal splines 33a is positioned concentrically upon the disc 27a, and projects axially from opposite faces of the disc 27a. This gear ring 32a is also provided with outwardly projecting radial gear teeth or cogs 34a which are in mesh with gear teeth 34 of the gear ring 32. Thus, it will be seen, that the gear structures are in constant meshing relation with each other. Since the disc 27 is secured to the shaft 18, it will be constantly driven as shaft 18 is revolved, thereby revolving the disc 27a and its associated gear ring, as well as shaft 18a.

Each drive transmitting means has a pair of clutch means associated therewith so that drive may be transmitted selectively from each of the gear structures. Referring again to FIG. 2, it will be seen that the gear structure 26 has a first clutch means 35 projected adjacent one face thereof and a second clutch means 36 positioned adjacent the other face thereof. The first clutch means includes a generally sleeve type hub member 37 which is concentrically positioned upon a sleeve bearing 38, also disposed in concentric relation with respect to shaft 18. The second clutch means includes a hub member 39, which is positioned upon a sleeve bearing 40, which in turn is concentrically disposed upon the shaft 18. Thus, the hub members are mounted on the shaft 18 to permit relative rotation between the shaft 18 and hub members.

The first clutch means 35 also includes a clutch driver disc 41 and a clutch driver ring 42 positioned in side-by-side relation, the clutch driver disc 41 having external splines 43 which engage the internal splines 33 of the gear ring 32. Similarly, the second clutch means also includes a clutch driver disc 44, and a clutch driver ring 45 disposed in axial side-by-side relation. The clutch driver ring is also provided with external splines 46 which matingly engage the splines 33 of the gear ring 32.

It will be noted, that the clutch driver disc 41 has an opening therethrough and internal splines 47 are formed about the inner circumferential edge which defines the opening, these splines engaging external splines 48 formed on the hub member 37. Similarly, internal splines are formed throughout the circumferential edge which defines the central opening in the clutch driver disc 44, and these splines matingly engage external splines on the inner end of the hub member 39. Thus, the clutch driver discs are mounted on their associated hub member so as to prevent relative rotation therebetween, but each clutch driver disc is capable of relative axial movement with respect to its associated hub member. Each clutch driver ring while being locked against relative rotation with respect to the gear ring, is capable of axial movement with respect to the gear ring.

It will be noted that hub member 37 has an annular collar 50 integrally formed therewith, and projecting radially outwardly therefrom. Hub member 39 also has a collar 51 integrally formed therewith and projecting radially outwardly therefrom. These collars are suitably apertured to permit the passage of bolts 52 therethrough.

A generally circular substantially flat, pressure plate 53 having an opening therethrough, is mounted upon the hub member 37 and positioned against the collar 50, while a substantially flat, generally circular pressure plate 54 to the central opening therethrough is concentrically mounted upon the hub member 39 and is positioned against the collar 51. These pressure plates are also provided with suitable apertures therethrough, which are disposed in registering relation with the apertures in the associated collars to permit the bolts 52 to pass therethrough.

A relatively small drive sprocket 55 having a central opening therethrough is positioned concentrically around the hub member 37, while a similar drive sprocket 56 is positioned concentrically around the hub member 39. It will be noted, that these drive sprockets are positioned against the associated collar of the hub member, and each has suitable threaded axially extending apertures therethrough which are threadingly engaged by the threaded end of the bolts 52. Thus, the pressure plate, hub member and drive sprocket of each clutch means are rigidly affixed together and axially constitute the output means of each of the clutches.

Referring again to FIG. 2, it will be noted that annular strips of clutch facing material are secured to opposite axial surfaces of the clutch driver disc 41 while the inner annular face of the pressure plate 53 has an annular strip 58 of clutch facing material affixed thereto. Similarly, the opposite faces of the clutch driver disc 44 have annular strips 59 of clutch facing material affixed thereto, while the pressure plate 54 has an annular strip of clutch facing material 60 secured to the inner face thereof.

Means are also provided for shifting the first and second clutch means into and out of driving relation with respect to the gear structure 26. The means for shifting the first clutch means 35 into and out of driving relation with respect to the gear structure 26 comprises an actuator nut 61, which is internally threaded as at 62 for threaded engagement with the threaded external inner end 21 of one of the bearing retainer units 19. The actuator nut 61 has an arm 63 integrally formed therewith and depending therefrom. A thrust bearing unit 64 is interposed between the inner end of the actuator nut 61 and the sprocket 55.

The means for shifting the second clutch means 36 into and out of driving relation with respect to the gear structure 26 also includes an actuator nut 65, which is internally threaded as at 66 and which threadingly engages the threaded external end of one of the bearing retaining units 19. The actuator nut 65 also has an arm 67 integrally formed therewith and depending therefrom, and a thrust bearing unit 68 is interposed between the end of the actuator nut 65 and the sprocket 56. Thus, it will be seen that by revolving the actuator nuts, pressure may be applied and relieved with respect to the first and second clutch means and thus permit the clutch means to be selectively drivingly engaged by the gear structure 26. It is pointed out that the threads of the actuator nut 61 and 65 extend in opposite directions with respect to each other.

The gear structure 26a also has a first clutch means 35a and a second clutch means 36a, the first clutch means 35a including a hub member 37a positioned concentrically upon a sleeve bearing 38a, the latter being disposed concentrically upon the shaft 18a. The second clutch means 36a also includes a hub member 39a, which is concentrically disposed upon a sleeve bearing 40a, which in turn is concentrically positioned upon a shaft 18a. The first clutch means 35a also includes a clutch driver disc 41a and a clutch driver ring 42a, which is provided with external splines 43a that matingly engage the splines on the gear ring 32a.

The second clutch means 36a includes a clutch driver disc 44a and a clutch driver ring 45a. The clutch driver ring 45a has external splines 46a thereon, which matingly engage the internal splines 33a on the gear ring 32a. The circumferential edge defining the opening through the clutch driver disc 41a, also has splines thereat which matingly engage external splines 47a on the inner end portion of the hub member 37a. Similarly, the clutch driver disc 44a has internal splines 48a which matingly engage splines 49a on the hub member 39a. Thus, the clutch driver disc and clutch driver rings are interrelated with their respective hub members and the gear structure 26a for relative axial movement therebetween.

The hub member 37a has an outwardly projecting radially collar 50a integrally formed therewith and projecting outwardly from the central portion thereof. Similarly, the hub member 39a has a radial collar 51a integrally formed therewith and projecting radially outwardly therefrom. The collars are suitably apertured to receive bolts 52a therethrough and a pressure plate 53a is interposed between the collar 50a and the clutch driver ring 42a. A pressure plate 54a is also interposed between the collar 51a and the clutch driver ring 45a.

A relatively small sprocket 55a is positioned against the external or outer face of the collar 50a while a similar sprocket 56a is positioned against the outer face of the collar 51a. It will be noted, that the pressure plates and sprockets are provided with suitable apertures to permit the bolts 52a to pass therethrough. Thus, it will be seen that the hub member 37a, pressure plate 53a, and sprocket 55a are affixed to each other to revolve as a unit, while the hub member 39a is fixedly connected to the pressure plate 54a and sprocket 56a to also move as a unit. It will be seen, that opposite faces of the clutch driver disc 41a are provided with annular strips 57a of clutch facing material, while the inner face of pressure plate 53a is provided with an annular strip 58a of clutch facing material. Similarly, opposite faces of the clutch driver disc 44a are provided with annular strips 59a of clutch facing material. The inner face of the pressure plate 54a is provided with an annular strip 60a of clutch facing material.

Means are provided for shifting the first clutch means into and out of engagement with the gear structure 26a, and this means includes an actuator nut 61a having internal threads 62a which threadingly engage the external threaded inner end portion 21a of one of the bearing retainer units 19a. The actuator nut 61a has a depending arm 63a rigidly affixed thereto, and a thrust bearing unit 64a is interposed between the actuator nut and the hub member 37a. Means for actuating the second clutch means includes an actuator nut 65a having internal threads 66a which threadingly engage the threaded external inner end portion 21a of one of the bearing retaining units 19a. The actuator nut 65a also has a depending arm 67a affixed thereto and depending therefrom, and a thrust bearing unit 68a is interposed between the actuator nut 65a and the adjacent end of the hub member 39.

An endless drive chain 69 is trained over the sprockets 55 and 55a and is also trained over a larger driven sprocket 70 which is affixed to a stub shaft 71 having one end journalled in a bearing 72 and having the other end thereof journalled in a bearing carried by one of the bosses 17. The stub shaft 71 actually constitutes an output shaft and has a sprocket 73 affixed to the outer end thereof. It will be noted, that the sprocket 73 is positioned exteriorly of the housing 11. A small tightener sprocket 74 shown in FIG. 4, which is vertically adjustable also engages the drive chain 69 to permit tension thereon to be variously adjusted.

Similarly, an endless drive chain 75 is trained around sprockets 56 and 56a, and is also trained around a relatively large sprocket 76 which is affixed to a stub shaft 77. One end of the stub shaft 77 is journalled in bearing 72a while the outer end thereof projects exteriorly through the housing and is journalled in suitable bearings carried by one of the bosses 17. A sprocket 78 is affixed to the outer end of the stub shafts 77 and a small tightener or idler sprocket 79 engages the chain 75 and is vertically adjustable to vary the tension on the chain. It is pointed out that the output sprockets 73 and 78 may be revolved in either direction independently of each other. It will also be noted, that as best seen in FIGS. 1 and 3, that the stub shafts 71 are positioned at a lower level than the shafts 18 and 18a.

Referring now to FIGS. 4, 5 and 6, it will be seen that the output sprocket 73 is provided with an endless chain 73 which is trained about a sprocket 81 keyed to a stub shaft 82 and is also trained about a sprocket 84, which is trained about a stub shaft 85. Shafts 82 and 85 will each have a ground engaging wheel W mounted thereon, which ground engaging wheels are located at one side of a vehicle, such as a tractor, or the like.

Similarly, the output sprocket 78 will have a chain 86 trained thereabout, which is also trained about a sprocket 87, which is affixed to stub shaft 88. Chain 86 is also trained about a sprocket 89, which is keyed to a stub shaft 92. Stub shafts 88 and 92 have ground engaging wheels W keyed thereto, and these ground engaging wheels are positioned in fore-and-aft spaced relation with respect to each other and on the side located oppositely to the ground engaging wheels associated with sprocket 73.

Means are also provided for simultaneously shifting the actuator nuts 61 and 61a and additional means are provided for shifting actuator nuts 65 and 65a. The means for shifting actuator nuts 61 and 61a includes an elongate thrust rod 92 which may be pivotally secured to a control lever positioned in a convenient location. The rod 92 has an arm 93 secured to one end thereof and the arm 93 is affixed to a second arm or lever 94 by a transverse member 95. The second arm or lever 94 is positioned interiorly of the transmission casing or housing 11.

One end of an elongate motion link 96 is pivotally connected to one end of the second arm 94 by a pivot 97 while the other end of the link 96 is pivotally connected to the lower end of the arm 63 by a pivot 98. A second motion link 99 has one end thereof pivotally connected to the opposite end of arm 94 by pivot 100, while the opposite end of link 99 is pivotally connected by a pivot 101 to the lower end of arm 63a. It is pointed out, that FIGS. 4 and 7 illustrates the actuator nuts 61a and 65a benig shifted to urge their associated pressure plates against the clutch means associated therewith, and into driving relation with respect to the gear structure 26a. The actuator nuts 61 and 65, on the other hand, as viewed in FIGS. 4 and 7, are shifted out of pressing relation with respect to its pressure plate so that the clutch means associated therewith is disengaged from the gear structure 26.

Similar means are also provided for simultaneously shifting the actuator nuts 65 and 65a, as best seen in FIGS. 3 and 7, and this means includes elongate thrust rod 102, which has one end pivotally connected to a control lever, not shown, and which has an arm 103 affixed to its other end. Arm 103 is rigidly connected to a second arm or lever 104 by means of a transverse member 105 and it is pointed out, that the second arm or lever 104 is positioned interiorly of the transmission housing or casing 11.

One end of an elongate motion link 106 is pivotally connected to one end of the second arm 104 by means of a pivot 107 while the other end of link 106 is pivotally connected by a pivot 108 to the lower end of arm 67 by a pivot 108. A second motion link 109 has one end thereof pivotally connected by a pivot 110 to the other end of arm 104, while the other end of the motion link 109 is pivotally connected to the lower end of arm 67a by a pivot 111. Thus, shifting movement of the rod 102 causes revolving movement of the actuator nuts 65 and 65a. FIG. 6 illustrates the actuator nut 65 in a drive condition, while the actuator nut 65a is in a release or disengaged condition.

As pointed out above, one specific application of the novel transmission system is for use as a transmission and steering system for vehicles having ground engaging wheels. Power will be supplied to the shaft 18 of the transmission system from an engine or other power plant. The slotted outer end of the shaft 18 will have a variable speed pulley or other variable speed drive means connected therewith, and power will constantly be supplied to the shaft. Since the gear structures 26 and 26a are in constant mesh with each other, these gear structures will also be constantly driven, as will the shaft 18a.

FIG. 5 represents the condition of the actuator nuts when the clutches associated therewith are in the disengaged or neutral condition. Thus, when the control levers for the thrust rods 92 and 102 are in a position so that the actuator nuts 61 and 61a, and actuator nuts 65 and 65a are disposed in the position illustrated in FIG. 5, no drive will be transmitted through any of the sprockets 55, 55a, 56 and 56a.

However, in the event that the actuator nuts are shifted from the neutral position so that the actuator nuts are disposed in the positions illustrated in FIGS. 4 and 7, the ground engaging wheels will be revolved or driven to propel the vehicle in a reverse direction. It is again pointed out that the threads on the actuator nut 61 extend in an opposite direction with respect to threads on the actuator nut 61a. Similarly, the threads on the actuator nut 65 extend in a direction oppositely to the threads on the actuator nut 65a. Thus, when the thrust rods 92 and 102 are shifted in the same direction, from a neutral position, the drive will be either in a forward or reverse direction depending on which of the clutch means are disposed in engaging relation with respect to the drive transmitting means.

It will be seen, that when the actuator nuts are disposed in the position illustrated in FIGS. 4 and 7, the actuator nuts 61a and 65a will be rotated in a direction to cause the first clutch means 35a and second clutch means 36a to be urged into driving relation with respect to the gear structure 26a. Simultaneously, the actuator nuts 61 and 65 will be rotated from neutral or disengaged condition in a direction to retain the first clutch means 35 and second clutch means 36 out of engaging relation with the gear structure 26. Since the drive is transmitted from the gear structure 26a to the ground wheels W through the sprockets 73 and 78, the vehicle will be propelled in a reverse direction.

In the event that it is desirable to drive the vehicle in a forward direction, it is merely necessary to shift the thrust rods 92 and 102, from the neutral position or from the position illustrated in FIGS. 4 and 7 in an opposite direction to the position shown in FIG. 6. This causes the actuator nuts 61 and 65 to be rotated in a direction to engage the first clutch means 35 and second clutch means 36 with the gear structure 26. Simultaneously, during this movement, this actuator nut 61a and actuator nut 65a will be urged in a direction to cause the clutch means associated therewith to be shifted out of driving engagement with the gear structure 26a. Drive will then be transmitted from the gear structure 26 through the first and second clutch means 35 and 36 respectively, to the ground wheels through the mediary of the sprockets 73 and 78, respectively.

In the event it is desirable to use the steering system to turn a vehicle, it is merely necessary to transmit drive through the ground wheels located at only one side of the vehicle, while the drive to the ground wheels at the other side of the vehicle remain in neutral. Alternatively, one may drive the ground wheels at one side in a forward direction while driving the ground wheels at the other side in a reverse direction. If it is desirable to maneuver in an area of relatively small compass, an operator may shift the nut actuator 61 to urge the first clutch means 35 into driving engagement with the gear structure 26 while simultaneously shifting the actuator nut 65a, so that it urges the second clutch means 36a into driving relation with the gear structure 26a. Therefore, by having the ground engaging wheels at one side of the vehicle being revolved in one direction and having the ground engaging wheels at the other side of the vehicle revolved in the opposite direction, one may obtain the greatest degree of maneuverability and steerability.

From the foregoing, it will be seen that the power takeoffs from opposite sides of the transmission housing, are driven from a single integrated transmission system and employs two pairs of clutch means, each pair working in unison. When one of the clutch means is shifted into engaging relation with its gear structure, a very effective and positive drive is transmitted from the associated gear structure through the clutch means. For example, when the actuator nut is revolved so that the hub member 37, pressure plate 53, and sprocket 55 are shifted axially towards the gear structure 26, the clutch driver disc 41 and clutch driver ring 42, will also be shifted axially towards the gear structure. While urging the clutch facing material on the pressure plate and clutch driver disc against the clutch driver ring and face of the gear structure 26, drive will be readily transmitted from the gear structure through the pressure plate and to the sprocket 55.

The clutch driver ring 42 is constantly maintained in driving relation with the gear structure 26, while both the pressure plate and the clutch driver disc 41 are secured to the hub member for rotation therewith. Thus, drive from the gear structure 26 will now be transmitted through the clutch driver ring 42 to the pressure plate when the various components of the first clutch means 35, are engaged in driving relation, and drive will also be transmitted to the clutch driver disc directly from the gear structure and through the clutch driver ring 42. Thus, by having a pair of drive transmitting gear structures which are constantly in mesh with each other and by utilizing two pairs of axially spaced apart clutch means, each being positioned adjacent one of the gear structures, a very simple but highly functional transmission system has been provided. The various components of the transmission system are arranged and constructed so that there is a minimum of wear to the various parts thereof while allowing a very positive drive to the output sprockets.

Referring now to FIGS. 8 through 12, it will be seen that a different embodiment of the transmission system is there shown and is designated generally by the reference numeral 209 and is comprised of a pair of identical transmission units 210 rather than a single unit as illustrated in the embodiments of FIGS. 1 through 7. In the embodiment illustrated in FIGS. 8 through 12, power is supplied from an engine E which may be a conventional internal combustion engine. The output shaft of the engine is connected to a torque converter C which provides a flexible coupling to a transmission T and to a conventional right angle gear box D. The output shafts of the gear box D drives the input shafts of the transmission units 210.

Since each transmission unit 210 is of identical construction, it is only necessary to describe the details of construction of one such unit. Each unit 210 comprises a housing or casing 211 which is of generally rectangular configuration and which is formed of a suitable rigid metallic material and is comprised of a bottom plate 212, side plates 213, and end plates 214. Access to the interior of the chamber 215 of the housing 211 is possible through the upper end thereof which is closed by top plate 216. The chamber 215 is sealed from the exterior and is partially filled with a suitable lubricant so that the various components of the transmission system may be continuously lubricated during the operation thereof.

Each side wall 213 has a pair of outwardly projecting apertured hollow bosses 217 integrally formed therewith. It will be noted that the pairs of bosses are of different size. One pair of the axially aligned bosses 217 accommodates a first shaft 218 therein while the other pair of bosses 217 accommodates a second shaft 218a therein. The shafts 218 and 218a are disposed at the same level and are substantially parallel with respect to each other.

One end of the shaft 218 is revolvably supported in suitable ball bearings 219 while the other end thereof is revolvably supported in roller bearings 222. One end of the shaft 218 has a lock ring secured thereto while the other end of the shaft is threaded and accommodates a nut 223 thereon. Similarly, the shaft 218a is revolvably supported at one end by ball bearings 219a and is supported at the other end thereof by roller bearings 222a. A nut 223a threadedly engages one end of the shaft 218a while a snap type lock ring retains the other end of the shaft 218a against axial displacement. Shaft 218 of each transmission unit 210 is connected to the output shaft of the gear box drive D and is constantly driven when the engine E is in operation.

Drive transmitting means are provided for transmitting drive from the shaft 18 of each transmission unit to the output shaft thereof and finally to the driven structure which may be a ground engaging wheel or wheels. This drive transmitting means includes a first gear structure 226 comprised of a generally flat circular gear 227 having an axial opening therein and positioned concentrically with respect to shaft 218. The gear 227 has a key 229 projecting radially inwardly of the axial opening therein which engages in a key way in the shaft 218 so that the shaft and gear 227 revolves as a unit. The gear 227 is also provided with a face 230 and has a plurality of outwardly projecting gear teeth or cogs 231.

A second gear structure 226a is comprised of a gear 227a having an axial opening therein and positioned concentrically of the shaft 218a. Gear 227a is provided with an inwardly projecting key 229a which engages in a key way of the shaft 218a to permit revolving movement of the gear and shaft as a unit. The gear 227a is also provided with a face 230a and has a plurality of gear teeth or cogs 231a projecting outwardly therefrom which are enmeshed with the gear teeth 231 of the gear 227. Thus, the gears 227 and 227a are constantly revolving as well as their associated shafts when the engine is operating.

Gear structure 226 is also provided with a gear ring or sleeve 232 having internal splines or teeth 233 integrally formed throughout the innercircumferential surface thereof. One end of gear ring 232 is provided with an annular surface 234 which is press fitted upon one end of the gear 227 to project axially therefrom. Similarly, gear structure 226a is also provided with gear ring 232a having internal splines or teeth 233a formed throughout the innercircumferential surface thereof. Gear ring 232a is also provided with an annular surface 234a which is press fitted upon a mating surface of gear 227a to project axially therefrom.

The gear structures 226 and 226a constitute driving means and each is provided with clutch means so that drive may be transmitted selectively from each of the gear structures. The clutch means associated with the gear structure 226 includes a gear 237 having a sleeve type hub 238 which is positioned upon a pair of sleeve bearings 239 mounted concentrically on the shaft 218. Similarly, a gear 237a having a sleeve type hub 238a is positioned upon a pair of sleeve bearings 239a disposed concentrically of the shaft 218a. With this arrangement, the gears 237 and 237a may rotate relative to their associated shafts 218 and 218a.

A substantially flat driven clutch disc 240 having an axial opening therein and having a plurality of internal teeth 241 is positioned interiorly of the ring gear 232 and concentrically around shaft 218. It will also be noted that the outer surface of the driven clutch disc is spaced radially inwardly of the teeth 233 of ring gear 232. The driven clutch disc 240 has annular strips of clutch facing material 242 secured to opposite faces thereof. A driver clutch disc 243 having a central opening therein is also concentrically disposed with respect to the shaft 218 and is provided with external teeth 244 throughout the outer-circumferential edge thereof which engage the internal teeth 233 of the ring gear 232. Thus, the driver disc 243 is constantly driven when the gear structure 226 is driven.

A pressure plate 245 is positioned interiorly of the ring gear 233 and is secured to the gear hub 238 by suitable bolts 246 which extend through openings in the hub 238. The face of the pressure plate which opposes the driver disc 244 is provided with an annular strip clutch facing material 247. It will be noted that the pressure plate 246 is disposed out of engaging relation with respect to the ring gear 232. A gear 248 having teeth 249 is concentrically positioned upon sleeve bearings 250 which are disposed concentrically of the shaft 218 thus permitting revolving movement of the gear relative to the shaft 218. The teeth 241 on the driven clutch disc 240 engage teeth 249 of the gear 248.

The clutch means associated with the gear structure 226a also include a driven clutch disc 240a having internal teeth 241a thereon and disposed concentrically of the shaft 218a. Annular strips 242a of clutch facing material are affixed to opposite faces of the clutch disc. A driver clutch disc 243a is positioned concentrically of the shaft 218a and has external teeth 244a disposed in engaging relation with the teeth 233a of the ring gear 232a. A pressure plate 245a is secured to the gear 237a by suitable bolts 246a and has an annular strip 247a of clutch facing material affixed to the face thereof which opposes the driver clutch disc 243a. A small gear 248a having exterior teeth 249a is concentrically disposed upon sleeve bearings 250a which are disposed concentrically of the shaft 218a.

Means are also provided for shifting the clutch means associated with the gear structure 226 and include an annular or cylindrically shaped piston 251 having a sleeve 252 secured thereto and projecting axially therefrom and disposed concentrically of the shaft 218. The annular piston 251 is positioned within an annular chamber 253 formed in the larger of the bosses 217. Suitable sealing rings 254 are provided along with retaining ring assemblies for providing a seal for the chamber 253 to prevent the escape of air therefrom. The boss 217 is also provided with a threaded opening therein for accommodating a threaded fitting 255 of a conduit 256 which is connected to suitable source of air under pressure. A ball bearing assembly 257 is interposed between the inner end of sleeve 252 and the outer end of gear 237.

The means for shifting the clutch associated with gear structure 226a also comprises an annular or cylindrical shaped piston 251a having a sleeve 252a integrally formed therewith and projecting axially therefrom. This piston and sleeve are disposed concentrically of the shaft 218a. Piston 215a is positioned within an annular chamber 253a formed in the other large boss 217. Suitable rings 254a and ring retaining assemblies are provided for sealing the chamber 253a. The boss 217 is also provided with a threaded opening for accommodating a threaded fitting 255a of a conduit 256a which in turn is connected in communicating relation to a source of air under pressure. A suitable ball bearing assembly 257a is interposed between the sleeve 252a and the gear 237a.

With this arrangement, when air is supplied to either of the chambers 253 or 253a, the associated annular piston will be shifted axially of the associated shaft to shift components of each clutch into driving relation with respect to each other. When the annular piston 251 is shifted to the left as viewed in FIG. 10, the pressure plate 245, the driven clutch disc and driver clutch disc will all be shifted axially to the left. The drive will, therefore, be transmitted not only from the drive clutch disc 243 to the driven clutch disc 240, but will also be imparted to the driven clutch disc from the face 230 of the gear 227. This drive is transmitted to the gear 248. The action is identical with respect to the clutch means associated with the gear structure 226a.

Referring now to FIGS. 9 and 11, it will be seen that the gears 248 and 248a are disposed in meshing relation with respect to large gear 258 which is positioned concentrically upon a shaft 259. Gear 258 is secured to a small gear 260 by means of bolts 261. It will be noted that suitable sleeve bearings 262 are interposed between the shaft 259 and the gears 258 and 260, thus permitting the shaft to be rotated relative to the gears. The shaft 259 has opposite end portions thereof journalled in suitable ball bearing assemblies 263 carried by side walls of the housing.

The gear 260 is disposed in meshing relation with respect to a large gear 264 which is splined upon a shaft 265. Opposite end portions of the shaft 265 are journalled in suitable ball bearing assemblies 266 carried in the side walls of the housing 211. A smaller gear 267 is also splined upon the shaft 265 and is revolvable with the gear 264 and shaft 265. Suitable locking collars 268 retain the gears 264 and 267 in proper position upon the shaft 265.

Gear 267 is disposed in meshing relation with respect to a large gear 269 which is splined upon shaft 259 and held in place by suitable locking collars. It will be noted that one end of shaft 259 projects exteriorly of the associated housing and is provided with splines 270 thereat to permit mounting of a gear, sprocket or other suitable drive means thereat. In the embodiment shown, a gear 271 is mounted upon the splined end 270 of the shaft 259 and is disposed in meshing relation with respect to gears 272 and 273 for driving suitable ground engaging wheels.

The operation of the embodiment of the transmission system illustrated in FIGS. 8 through 12 is similar to that of the embodiment illustrated in FIGS. 1 through 7 except each unit 210 operates the driven structure such as ground wheels located at one side of the vehicle. In this regard, a suitable valve will be provided for shifting the clutch shifting means for each unit. Each valve will have a neutral position whereby no air under pressure will be supplied to the pair of associated annular chambers so that the ground engaging wheels controlled by the particular transmission unit 210 will be disengaged from driving relation to the power plant. Each valve will have a reverse and forward position whereby in one position, drive will be transmitted from the gear structure 226 through its associated clutch means while the clutch means associated with the other gear structure 226a will be maintained in disengaged relation. In the other position, drive will be from the gear structure 226a through its associated clutch means while the clutch means associated with the gear structure 226 will be maintained out of engaging relation with gear structure 226.

With this arrangement, it will be assumed that the gear structure 226 will revolve in a forward direction while the gear structure 226a will be revolved in a reversed direction. Thus, if it is desirable to drive the vehicle in a forward direction both valves will be shifted to the forward drive position thus causing the pistons 251 and their associated sleeves 252 to be shifted to axially of the shafts 218 to compress the pressure plates 245, the driver clutch discs 243, the driven clutch discs 240 and the gears 227 into compressed relation. Drive will be transmitted through the driven clutch discs 240 to the gears 248 and ultimately to the shafts 259 to drive the ground engaging wheels in a forward direction. The clutch means associated with the gear structure 226a will be maintained out of driving relation with respect to the gear structure 226a. However, if it is desirable to change the drive to reverse, it is merely necessary to shift both valves to the reverse position thus causing the annular pistons 251a and sleeves 252a to be shifted axially of the shafts 218a to drivingly interconnect the gear structures 226a with the gears 248a. The gears 248a will drive the shafts 259 in a reversed direction while the clutches associated with the gear structures 226 will be maintained out of engagement therewith.

Turning or steering of the vehicle may be accomplished by driving from only one unit 210 in one direction and driving the other unit in an opposite direction or retaining the other unit inoperative. Sharp turning or steering may be accomplished by driving one unit in one direction and the other unit in the opposite direction.

In the present transmission system, a second shaft is constantly driven by the continuously revolving input shaft through a pair of continuously driven, enmeshing gears. In the first embodiment, the output sprockets transmit drive to a driven shaft-mounted sprocket by means of a chain which is also trained around an idler sprocket. With the particular mechanical drive, illustrated in the embodiment of FIGS. 1–7, the idler sprocket is engaged and revolved by the least tensioned portion of the driven chain. Thus abrupt drive changes (forward to reverse or vice versa) may be achieved without damage to the idler sprocket.

From the foregoing description, it will, therefore, be seen that we have provided a novel transmission system which is especially suited for use in providing a positive drive to drive engaging wheels for vehicles and the like, and which system may be used in such a vehicle for providing a highly effective steering means.

It will, therefore, be seen that we have provided a novel transmission system which is not only of simple and inexpensive construction in operation, but one which functions in a more efficient manner than any heretofore known comparable system.

It will, of course, be understood that various changes may be made in the form, details, arrangement and proportions of the various parts without departing from the scope of our invention.

What is claimed is:

1. A transmission system for relatively interconnecting an engine with a pair of driven structures, such as ground engaging wheels, said system comprising:
   a pair of revolving drive transmitting gear members drivingly engaging each other, said members being revolvable in opposite directions about substantially parallel axes, one of said members being operatively connectible with an engine to receive drive therefrom,
   a pair of revolvable driven members connectible to the driven structures,
   first and second clutches, one clutch being shiftable into and out of engagement with one of said drive transmitting members and the other clutch being shiftable into and out of engagement with the other drive transmitting member, each clutch including an input means and an output means,
   means drivingly interconnecting the output means of said first clutch with one of said driven members, and means drivingly interconnecting the output means of said second clutch with the other of said driven members,
   an actuator for each clutch, each actuator being operable to shift its associated clutch into and out of engaging relation with the associated drive transmitting member,
   a control mechanism operatively connected with said clutches for operating the same, said control mechanism being shiftable from a neutral position to first and second drive positions, said control mechanism when in the neutral position causing disengagement of the pair of clutches from said drive transmitting members, said control mechanism when shifted to the first drive position causing one clutch to be engaged with its drive transmitting member while the other clutch is disengaged from its drive transmitting member, and said control mechanism when shifted to the second drive position causing the other clutch to be engaged with its drive transmitting member while said one clutch is disengaged from its drive transmitting member so that each driven member may be selectively revolved in either direction and independently of the other driven member.

2. A transmission system for selectively innterconnecting an engine with a pair of driven structures, such as ground engaging wheels, said system comprising:
   a pair of substantially identical transmission units, each unit comprising a pair of similar gears continuously in mesh with each other and having their axes of rotation disposed in substantially parallel relation, one of said gears being operatively connectible with an engine to be power revolved thereby,
   a pair of revolvable driven members connectible to the driven structures,
   first and second clutches, one clutch being shiftable into and out of engagement with one of said gears, and the other clutch being shiftable into and out of engagement with the other of said gears, each clutch including an input means and an output means,
   means drivingly interconnecting the output means of the clutches of one transmission unit with each other and with one of said driven members, and means drivingly interconnecting the output means of the clutches of the other transmission unit with each other and the other of said driven members,
   each transmission unit including an actuator for each clutch, each actuator being operable to shift its associated clutch into and out of engaging relation with the associated gear,
   a pair of control mechanisms one of which controls operation of the actuators for the clutches of one unit to cause simultaneous operation of said last mentioned actuators, and the other control mechanism controlling operation of the actuators for said clutches of the other unit to cause simultaneous operation of said last mentioned actuators,
   each control mechanism being shiftable from a neutral position to first and second drive positions, each control mechanism when in the neutral position causing disengagement of the pair of clutches controlled thereby from said gears, each control mechanism when shifted to the first drive position causing one clutch of the pair of clutches controlled thereby to be engaged with its gear while the other clutch of said pair is disengaged from its gear, and each control mechanism when shifted to the second drive position causing the other clutch of the pair of clutches controlled thereby to be engaged with its gear while said one clutch is disengaged from its gear so that each driven member may be selectively revolved in either direction and independently of the other driven member.

3. The transmission system as defined in claim 2 wherein said actuator for each clutch comprises a piston and cylinder device.

4. The transmission system as defined in claim 3 wherein the input means of each clutch is positioned interiorly of the associated gear and in constant engagement therewith.

5. A transmission system for selectively interconnecting an engine with a pair of driven structures, such as ground engaging wheels, said system comprising:
   a housing,
   a pair of substantially parallel shafts positioned within said housing and journalled thereon for rotation relative thereto, one of said shafts being operatively connected with an engine to be revolved thereby,
   a pair of similar gears each being secured to one of said shafts for rotation therewith, said gears being continuously in mesh with each other and being revolvable in opposite directions,
   a pair of spaced apart revolvable driven members journalled on said housing for rotation relative thereto,
   first and second pairs of clutches, one clutch of each pair of clutches being shiftable into and out of engagement with one of said gears, and the other clutch of each pair of clutches being shiftable into and out of engagement with the other of said gears, each clutch including an input element and an output element, each of said clutch elements being mounted in coaxial relation on one of said shafts and in coaxial relation with one of said gears,
   means drivingly interconnecting the output elements of said first pair of clutches with each other and with one of said driven members, and means drivingly interconnecting the output elements of said second pair of clutches with each other and the other of said driven members,
   an actuator for each clutch, each actuator being operable to shift the clutch elements of each clutch into engaging relation with each other and with the associated gear,
   a pair of control mechanisms one of which interconnects the actuators for said first pair of clutches to cause simultaneous operation of the interconnected actuators, and the other control mechanism interconnecting the actuators for said second pair of clutches for simultaneous operation thereof,
   each control mechanism being shiftable from a neutral position to first and second drive positions, each control mechanism when in the neutral position causing disengagement of the pair of clutches controlled thereby from said gears, each control mechanism when shifted to the first drive position causing one clutch of the pair of clutches controlled thereby to be engaged with its gear while the other clutch of said pair of clutches is disengaged from its gear, and each control mechanism when shifted to the second drive position causing the other clutch of the pair of clutches controlled thereby to be engaged with its gear while said one clutch is disengaged from its gear so that each driven member may be selectively revolved in either direction and independently of the other driven member.

6. The transmission system as defined in claim 5 wherein the input element of one of said first pair of clutches, and the input element of one of the clutches of said second pair of clutches is disposed interiorly of one of said gears.

7. The transmission system as defined in claim 5 wherein each clutch actuator comprises an external threaded element and an internal threaded element threadingly engaging each other and disposed in coaxial relation on one of said shafts and being revolvable relative thereto, said threaded actuator elements when revolved relative to each other producing relative axial shifting movement between the associated clutch and the associated gear.

8. The transmission system as defined in claim 5 wherein the means drivingly interconnecting the output elements of the first pair of clutches together comprises a chain and sprocket drive.

9. The transmission system as defined in claim 5 wherein each of said gears is internally splined and wherein one clutch element of said first pair of clutches and one clutch element of said second pair of clutches are externally splined and are in constant engagement with one gear for rotation therewith.

10. The transmission system as defined in claim 5 wherein each of said gears has opposed radial faces, one face of each gear being engageable with one clutch of said first pair of clutches, and the other face of each gear being engageable by one clutch of the other of said pairs.

11. The transmission system as defined in claim 1 and a transmission housing having a hollow interior sealed from the exterior and containing a lubricant therein, said drive transmitting members, clutches, means drivingly interconnecting the output means, and actuators all being disposed within said housing and being constantly lubricated during operation of the transmission system.

References Cited
UNITED STATES PATENTS

| | | | |
|---|---|---|---|
| 2,107,072 | 2/1938 | Herrington | 74—665 |
| 2,833,161 | 5/1958 | Fossati | 74—665 X |
| 2,996,934 | 8/1961 | White | 74—722 |
| 3,017,941 | 1/1962 | Baker | 74—665 X |
| 3,302,485 | 2/1967 | Gerst | 74—665 |
| 3,412,631 | 11/1968 | Frost | 74—695 |

ARTHUR T. McKEON, Primary Examiner

U.S. Cl. X.R.

74—220, 722